Aug. 8, 1967  A. CASSIDY ET AL  3,334,851

CABLE HANGER

Filed July 26, 1966  3 Sheets-Sheet 1

INVENTORS
ANDREW CASSIDY
ROLLAND W. PEET

Donald R. Johnson
ATTORNEY

United States Patent Office 3,334,851
Patented Aug. 8, 1967

3,334,851
CABLE HANGER
Andrew Cassidy, Upland, Pa., and Rolland W. Peet, Wilmington, Del., assignors to Sun Shipbuilding & Dry Dock Company, Chester, Pa., a corporation of Pennsylvania
Filed July 26, 1966, Ser. No. 567,977
1 Claim. (Cl. 248—68)

This invention relates to supports, and more particularly to hangers for holding conductors on a fixed structure.

Previously, various types of hangers have been used to hold conductors, such as cables, pipes, ducts, or the like on a structure such as a vehicle, a ship bulkhead or overhead, or other installation. However, such hangers have invariably involved certain disadvantages, such as excessive weight, high cost of fabrication and installation, rigidity of design and impossibility of modification to meet changed conditions, lack of universality, tendency to become loose and shift in position under adverse conditions, etc.

An object of this invention is to provide a novel cable hanger of light weight and inexpensive construction.

Another object is to provide a novel cable hanger which is extremely versatile and capable of rapid installation, but which can be readily modified when necessary to meet changed conditions.

According to the present invention, the cable hanger consists of an elongate channel member and a flexible band which is completely looped around the channel so as to provide a sturdy, yet resilient, support for conductors, such as cables and other conduits. The channel member is supported by partable hanger attachment means having one of its parts carried by the channel member and another of its parts secured to external hanger supporting structure. The flexible band snugly holds the conduits againts the external planar wall of the channel, the conduits extending transversely to the length of the channel member. In order to provide a sturdy support for cables of different diameters in a single cable run, the channel member is apertured, and a rigid band-retaining member or clip is firmly mounted in the aperture, the band-retaining member having a plurality of band-receiving apertures therein; in this case, the band passes through a selected one of these band-receiving apertures depending upon the diameter of the cable immediately adjacent thereto.

A detailed description of the invention follows, taken in conjunction with the accompanying drawings, wherein.

Figure 1:
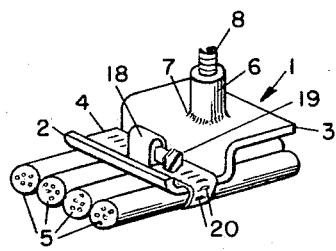
FIG. 1 is a perspective view of one form of hanger, showing a portion only of the hanger attachment means.
Figure 2:
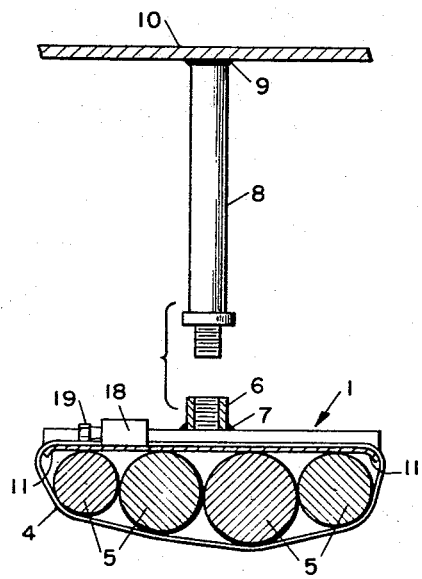
FIG. 2 is a side view of the hanger together with its attachment means, a portion thereof being broken away to show a detail.

Referring to the drawings, particularly FIGS. 1 and 2, one embodiment of the invention may be seen which shows the basic structure. Hanger 1 comprises an elongate channel member 2 having an integral flange 3 which is joined to the outer end of one side wall of the channel and which extends in a direction away from the channel and parallel to the base of the channel; it may thus be seen that flange 3 is offset from the base of the channel. Hanger 1 is fabricated in various lengths, such as 2″, 3″, and 4″, for example; for each particular application of the hanger, a particular length of hanger is selected which will be approximately equal to the diameter (or combined diameters) of the cable (or cables) in the run desired to be supported in that application. The hanger 1 is fabricated from a suitable material such as thin steel plate.

A flexible non-magnetic metal band 4 (to be further described hereinafter) extends lengthwise through the interior of channel 2 and holds conductors or cables 5 on the external planar wall of channel 2. The channel 2 extends transversely to the axes of the parallel cables 5. These cables 5, either singly or together, form what is generally referred to as a cable run which may extend throughout many areas of a ship and which, when any particular vibration or concussion can be anticipated, must be most firmly and securely held.

For attaching the hanger 1 to a stationary support, such as the steel deck of a ship, a female fitting (internally-threaded collar) 6 is welded at 7 to the center of flange 3, on that surface of the flange opposite to the cable-supporting wall of channel 2. The fitting 6 is arranged to screw onto a threaded stud 8 which is welded at 9 (see FIG. 2) to a stationary support 10 such as the steel deck of a ship. Generally, the unthreaded end of stud 8 is welded to the underside of the deck. The elements 6, 8 thus constitute partable hanger attachment means.

Both ends of the channel 2 are slightly rounded by being bent downwardly, away from the flange 3, as indicated at 11 in FIG. 2. The curvature thus afforded the band 4 at these points avoids sharp turns in the metal band, thus preventing fracture or rupture upon shock or impact. This increases the life and strength of the hanger.

The flexible metal band 4, which extends lengthwise through the interior of the channel 2 and encircles the cables 5 of the run (see FIG. 2), places the conductors or cables under compression. This band may be of the type disclosed in Patents Nos. 2,386,629 and 2,395,273, and is a length of flat metal band (made of resilient stainless steel, for example) which is preferably initially performed into a circular configuration, though in actual use it is distorted out of this circularity, as will be described subsequently. A housing 18 which provides a screw casing is rigidly secured to band 4 near one end thereof, as by means of a saddle (not shown). A screw 19 is mounted for rotation in housing 18, this screw having at its inner end, inside housing 18, a continuous spiral thread (not shown) integrally formed therewith. The band 4 is provided with a plurality of longitudinally spaced transversely extending slots or elongated apertures 20 (see FIGS. 2 and 4), beginning at the end of band 4 opposite to housing 18; slots 20 are so shaped and positioned on an incline transversely as to conform to and receive the spiral thread of the tightening (tensioning) and holding screw 19. The end walls of the housing 18 are spaced away from the aforementioned saddle sufficiently to accommodate the overlapping (free) end of the band 4.

In use, by turning screw 19 counterclockwise sufficiently, the free or outer end of band 4 will be backed out of the housing 18, permitting the band to be looped over the cables 5 and along the interior of channel 2. The outer end of the band may then be reinserted in the housing 18 into cooperative relation with the spiral thread therein, whereupon rotation of the screw 19 in the clockwise direction will draw the band 4 through the housing to tighten or tension the band about the cable run, thereby drawing the band into engagement with the internal surface of channel 2 and compressively binding the cable run to the external planar wall of the channel. The complete wrap-around of the flexible member or band 4 prevents impact and shock from dislodging the conductors 5 being supported.

The cable hanger of this invention is inexpensive and of light weight (which latter feature is advantageous in ship construction), and it permits rapid installation of single cables, or of a number of cables of smaller size. For installation, all that needs to be done is to screw a hanger 1 onto a prepositioned stud 8, position the cables of the run adjacent the external planar wall of the channel 2, loop a metal band 4 over the cables and the channel, and then tighten the band (by turning the screw 19, as previously described).

In addition, the cable hanger of this invention makes it possible to easily modify the wiring, in the event that more cables are needed than originally scheduled. The existing hanger can be unscrewed from the stud 8, and a new hanger of the desired size (for example, a longer one) installed.

Although in FIG. 1 the individual cables 5 are all of the same diameter, the invention is not limited in application to such a run. The individual cables 5 can be of different diameters, as illustrated in FIG. 2. In the cable run or array illustrated in FIG. 2, the larger cable is toward the center of the array, and the cable sizes do not vary too much. When the smaller cables are at the center of the run, or when there is a great disparity in cable sizes in the run, a modified hanger assembly can be used. This modified assembly, which uses one or more specially-designed band-retaining members or clips, is illustrated in FIGS. 3-5, and will now be described.

Figure 3:
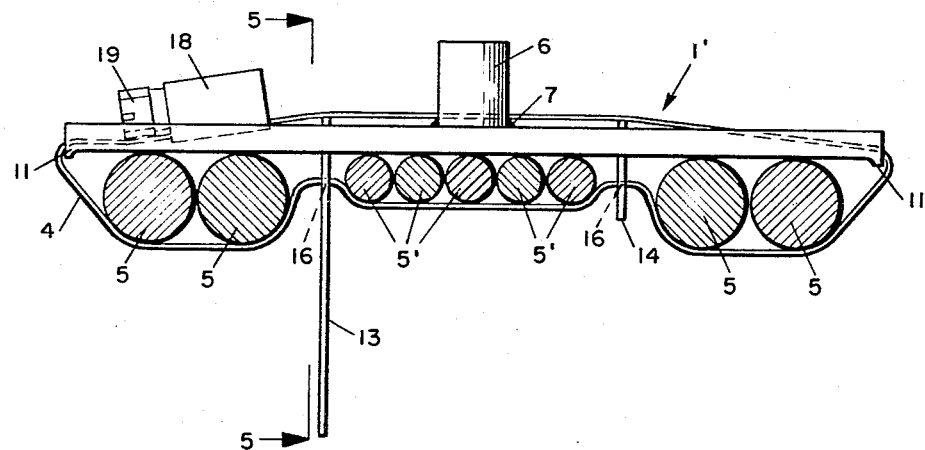
FIG. 3 is a side view of a modified hanger assembly.
Figure 4:
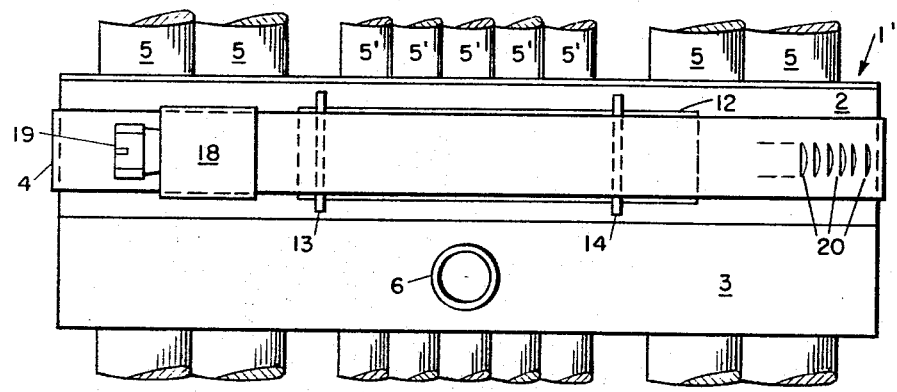
FIG. 4 is a top view of the assembly of FIG. 3.
Figure 5:
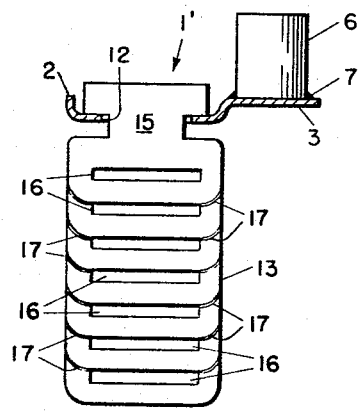
FIG. 5 is a section taken on line 5—5 of FIG. 3 but omitting the flexible band and cables.

FIGS. 3-5 illustrate the hanger itself, without the complete partable hanger attachment means, but with the band and the cable run (except in FIG. 5, wherein, for purposes of clarity, the band and the cable run are omitted).

Hanger 1' is fabricated in various lengths, such as 4", 6", 8", and 10", for example, and is quite similar to hanger 1, previously described, except that the former has an elongate (rectangular) aperture 12 in the base of the channel 2. In FIGS. 3 and 4, the cable run to be supported by the hanger 1' includes a plurality of cables 5' which are of smaller diameter than cables 5, the smaller-diameter cables 5' being located at the center of the run. If no special provision were made, with the run illustrated in FIGS. 3 and 4 there would be one or more loose cables under the band and it would be impossible to satisfactorily fasten the run depicted to a hanger by means of a flexible metal band.

According to this invention, a pair of band-retaining members or clips 13 and 14 utilized, one at each respective end of the group of smaller-diameter cables 5', the function of these clips being to guide the band 4 to, and retain the band in, a position closer to the hanger 1', such that the band contacts the smaller-diameter cables 5' with a compressive force sufficient to hold them securely against the cable-engaging surface of hanger 1'.

As shown more particularly in FIG. 5, a band-retaining member 13, which is formed from thin steel plate such as sixteen-guage galvanized sheet metal, has at one end an integral T-shaped tab 15 the leg of which has a width just slightly less than the width of aperture 12, so that the leg of the T can extend through this aperture and the head of the T will engage the material of the upper surface of channel 2 at opposite points located on the longer sides of aperture 12, as illustrated in FIG. 5. The width of the head of the T 15 is considerably less than the length of aperture 12, so that the head of the T can be inserted through aperture 12 and then the member 13 can be rotated bodily, about a vertical axis, through 90° to bring it to the mounting position illustrated in FIG. 5. The member 14 is exactly similar to member 13, and the former can be mounted in aperture 12 in the same manner as member 13. It should be obvious that, when members 13 and 14 have been mounted within aperture 12, but before the band 4 has been tightened in such members, they can be slid to any desired positions along the length of aperture 12.

Each of the band-retaining members 13, 14 has therein a plurality (for example, seven) of spaced, parallel band-receiving aperatures 16 through a selected one of which band 4 can pass (see FIG. 3). The particular one of the apertures 16 selected for reception of band 4 (i.e., the particular aperture 16 through which the band is threaded after the members 13, 14 and the cables 5, 5' have been properly positioned) depends upon the diameter of the cable 5' which is immediately adjacent thereto. In general, the band 4 is threaded through an aperture 16 spaced from hanger 1' a distance somewhat less than the diameter of cable 5', so that when the looping of band 4 has been completed and this band is tightened or tensioned (in the manner described hereinabove), it will be brought into tight engagement with cables 5'. It may be seen that the tightening of this band also brings the head of the T 15 into firm engagement with the upper surface of channel 2, thus tightening members 13 and 14 in position in aperture 12.

The material of members 13 and 14 is scored at the two ends of each of the apertures 16 (except the uppermost aperture) and even with the upper edges of such apertures, an indicated at 17. These score lines or stamped depressions enable the unused or excess outer (lower) portion of each member to be broken off with pliers and discarded, leaving smooth edges with rounded corners. This breaking-off feature is illustrated in FIG. 3, wherein member or clip 13 is shown full length (unbroken) while the excess outer portion of clip 14 has been broken off, along the appropriate score lines.

Figure 6:
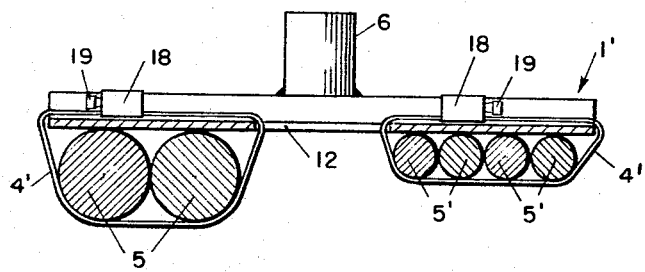
FIG. 6 is a side view of a hanger similar to that of FIG. 3 but illustrating a modified cable securing arrangement.

The provision of an aperture 12 in hanger 1' permits installation of a number of varying-diameter cables over the entire length of the hanger (as depicted, for example, in FIGS. 3 and 4, using the clips 13 and 14) or the installation of individual (one or more) cables at one or both ends of the hanger, as illustrated in FIG. 6, now to be described. It will of course be realized that in FIGS. 1 and 2, also, there are a number of cables 5 installed over the entire length of the hanger 1, but in this case the diameters of the cables 5 are all the same (FIG. 1), or do not differ greatly (FIG. 2).

Referring now to FIG. 6, the aperture 12 in hanger 1' has a width such as to accommodate therein the flexible band 4'; by way of example, the aperture 12 may have a width of ⅝" and the band a width of 9/16". A pair of larger-diameter cables 5 may be placed at one end of the hanger 1', and then the band 4' (similar in construction to band 4 previously described, but preferably of a shorter length than the band 4 used in FIGS. 3 and 4) may be passed around one end of the hanger, over the cables 5, and through the adjacent end of aperture 12; following this, the band 4' is tightened or tensioned in the manner previously described. Similarly, a plurality of smaller-diameter cables 5' may be placed at the other end of the hanger 1', and then another band 4' may be passed around the other end of the hanger, over the cables 5', and through the other end of aperture 12; following this, the other band 4' is tightened or tensioned in the same manner as described previously.

Although not illustrated in FIGS. 3-6, it is pointed out that, prior to placing of the cables adjacent hangers 1', these hangers are screwed onto a fixed stud 8 by means of the respective female fittings 6, just as in FIG. 2.

The invention claimed is:

A hanger for compressively banding and supporting a run of plural cables, said hanger comprising an elongate rigid channel member having an elongate aperture in the base of the channel, said member being adapted to extend transversely to the axis of a run of plural cables and having its external planar wall adapted to supportably engage cables of the run; a band-retaining member mounted in said aperture and extending outwardly away from said channel base on the extenral planar wall side of said channel, said last-mentioned member having at least one band-receiving aperture therein; a length of flat flexible metal band extending lengthwise through at least a portion of the interior of said channel and through said band-receiving aperture and encircling the cables of said run, band clamping means for tightly securing together the ends of said band length to tension the band about the cable run whereby said band is drawn into engagement with the internal surface of said channel and with said band-retaining member and said cable run is compressively bound to said external wall of said channel, and partable hanger attachment means having one of its parts secured to said channel members and another of its parts adapted to be integrally secured to external hanger supporting structure.

References Cited

UNITED STATES PATENTS

| | | | |
|---|---|---|---|
| 1,086,442 | 3/1914 | Cornelius | 248—59 |
| 1,523,164 | 1/1925 | Barnard et al. | 248—300 X |
| 2,322,753 | 6/1943 | Thomas | 248—68 X |
| 2,545,702 | 5/1952 | Prevost | 239—513 |
| 2,689,995 | 9/1954 | Smith | 24—243 |
| 2,939,664 | 6/1960 | Wessler | 248—68 |
| 2,964,274 | 12/1960 | Richardson et al. | 248—68 |

FOREIGN PATENTS 240,764  12/1959  Australia.

CHANCELLOR E. HARRIS, *Primary Examiner.*

CLAUDE A. LE ROY, *Examiner.*